United States Patent [19]

Yamashina et al.

[11] Patent Number: 4,893,766
[45] Date of Patent: Jan. 16, 1990

[54] TAPE CASSETTE HAVING A FRONT LID AND A BACK LID

[75] Inventors: Shuichi Yamashina, Tochigi; Minoru Yahagi; Yuji Iwahashi, both of Miyagi, all of Japan

[73] Assignee: Sony Corporation, Tokyo, Japan

[21] Appl. No.: 279,539

[22] Filed: Dec. 5, 1988

[30] Foreign Application Priority Data

Dec. 28, 1987 [JP] Japan .................. 62-200440

[51] Int. Cl.[4] ............................................ G11B 23/04
[52] U.S. Cl. .................................................... 242/198
[58] Field of Search .............................. 242/197–199; 360/132

[56] References Cited

U.S. PATENT DOCUMENTS

| | | | |
|---|---|---|---|
| 4,382,522 | 5/1983 | Shimazu et al. | 242/198 X |
| 4,382,523 | 5/1983 | Sekine et al. | 242/198 X |
| 4,418,373 | 11/1983 | Fujimori et al. | 360/132 |
| 4,799,120 | 1/1989 | Sakai et al. | 360/132 |

*Primary Examiner*—David Werner
*Attorney, Agent, or Firm*—Philip M. Shaw, Jr.

[57] ABSTRACT

A tape cassette is disclosed, in which upon non-use a tape-exposed portion is closed by a front lid and a back lid provided at the tape-exposed portion of a reel-to-reel type tape cassette. In this case, an injection gate is provided at a thick portion of a front wall of the front lid at its central portion thereby to mold the front lid.

4 Claims, 3 Drawing Sheets

TAPE CASSETTE HAVING A FRONT LID AND A BACK LID

BACKGROUND OF THE INVENTION

1. Field of the Invention

The present invention relates generally to tape cassettes and more particularly to a tape cassette suitable for use with, for example, a video tape recorder (VTR).

2. Description of the Prior Art

In a conventional tape cassette for a video tape recorder, in order that a tape wound between two reels within the cassette housing of the tape cassette is opposed to a rotating head upon use, the magnetic surface of the tape is partially exposed to the outside from the cassette housing. Therefore, upon non-use, a front lid is used to protect the magnetic surface of the tape exposed to the outside from the cassette housing. This front lid is constructed such that when the tape cassette is loaded into the video tape recorder, the front lid is automatically rotated to allow the rotating head and the magnetic surface of the tape to be opposed to each other. Such a front lid is molded of a synthetic resin. For example, the assignee of the present application has proposed a front lid of tape cassette as is disclosed in Japanese Laid-Open Utility Model Gazette No. 62-55285.

FIG. 1 is a perspective view of the front lid disclosed in the above-mentioned gazette. Referring to FIG. 1, the front lid 1 comprises a front plate 2 of substantially L-shape in cross section with a top plate 3 and right and left side wall plates 4, 4. The front lid 1 is formed to be substantially U-shaped on the whole. The right and left side wall plates 4, 4 have pivot shafts 5, 5 implanted on their insides. These pivot shafts 5, 5 are rotatable relative to the cassette housing. To mold the front lid 1 with such a configuration, a cut-away 6 is formed through the front plate 2 and the top plate 3 at their substantially central positions to dispose a gate. Further, a slant gate disposing surface 7 is formed within this cut-away 6 and a gate chip is disposed on the gate disposing surface 7 to perform the molding. Thus, the recess is left on the surface of the front lid 1 and the satisfactory appearance of the tape cassette is spoiled. Also, such a tape cassette is not suited to the standards of a so-called 8 mm video tape cassette which has a format made recently. In the above-mentioned 8 mm video tape cassette, as shown in FIG. 2, upon non-use, the tape exposed to the outside of the tape cassette is pinched between the front lid 1 and a back lid 8 pivoted to the front lid 1 to become rotatable in the direction shown by an arrow A - A', thus the magnetic surface thereof being protected from dust and so on. The front lid 1 of this 8 mm video tape cassette comprises the front plate 2, the top plate 3 and the right and left side wall plates 4, 4 having windows 9, 9 for detecting the tape end similarly to the tape cassette shown in FIG. 1. The portion between the front plate 2 and the top plate 3 is formed as a curvature-plane 2a. To finish the surfaces of the front plate 2, the curvature-plane 2a and the top plate 3 well, the recess 6 is not formed therethrough unlike the tape cassette shown in FIG. 1. For this reason, an injection gate portion 10 has to be formed on the inside of the left or right side wall plate 4, as shown in FIG. 2.

When the front lid 1 shown in FIG. 2 is made by means of the injection molding, the injection gate portion 10 is formed at only one position inside the left or right side wall plate 4 so that the flow of the synthetic resin is not well-balanced. Thus, when the synthetic resin is injected through the injection gate portion 10 at the side of right side wall plate 4, the pressure and temperature of the resin are different in the respective portions of the front plate 2, the top plate 3 and the left side wall plate 4 so that a sink mark is frequently produced in the left side wall 4 at the opposite side of the injection gate portion 10, thus a so-called short shot being caused easily. Hence, a flow mark occurs to lower the productivity thereof. In order to suppress the appearance of the sink mark, a large injection pressure is required. If the injection pressure is increased, "warp" in the respective portions of the front lid 1 becomes large. Further, a slider mold core has to be used as a mold core for injection-molding the front lid 1. A gate chip tends to enter a parting line plane of this mold core, which fact causes "burr" or the like.

OBJECTS AND SUMMARY OF THE INVENTION

Accordingly, it is an object of the present invention to provide an improved tape cassette.

It is another object of the present invention to provide a tape cassette which can prevent molded parts from being warped upon high pressure injection.

It is a further object of the present invention to provide a tape cassette which can remove a so-called short shot, a flaw mark, a sink mark, a burr and so on.

It is a yet further object of the present invention to provide a tape cassette which can increase its productivity.

It is a still further object of the present invention to provide a tape cassette of which the surface can be finished well.

According to one aspect of the present invention, there is provided a tape cassette in which upon non-use a tape-exposed portion is closed by a front lid and a back lid provided at said tape-exposed portion of a reel-to-reel type tape cassette, comprising an injection gate provided at a thick portion of a front wall of said front lid at its central portion, said injection gate being used to mold said front lid.

These, and other objects, features and advantages of the present invention will become apparent from the following detailed description of the preferred embodiment to be taken in conjunction with the accompanying drawings, throughout which like reference numerals designate like elements and parts.

DETAILED DESCRIPTION OF THE PREFERRED EMBODIMENT

An embodiment of a tape cassette according to the present invention will hereinafter be described with reference to FIGS. 3 to 6.

Figure 4:
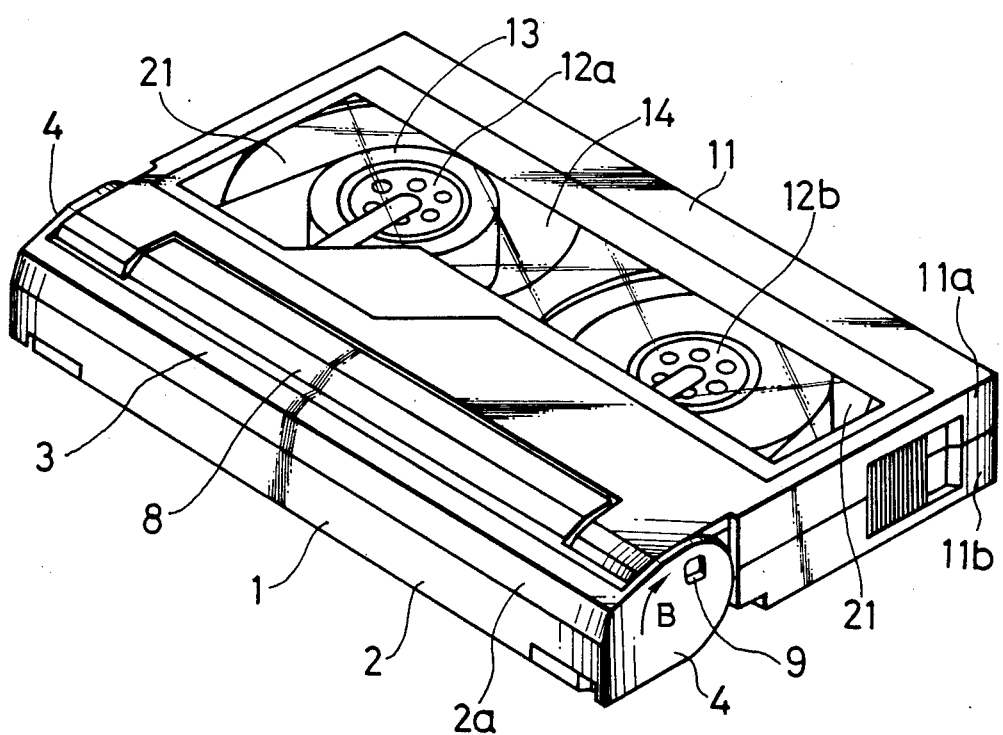
FIG. 4 is a perspective view of an embodiment of a tape cassette according to the present invention.
Figure 5:
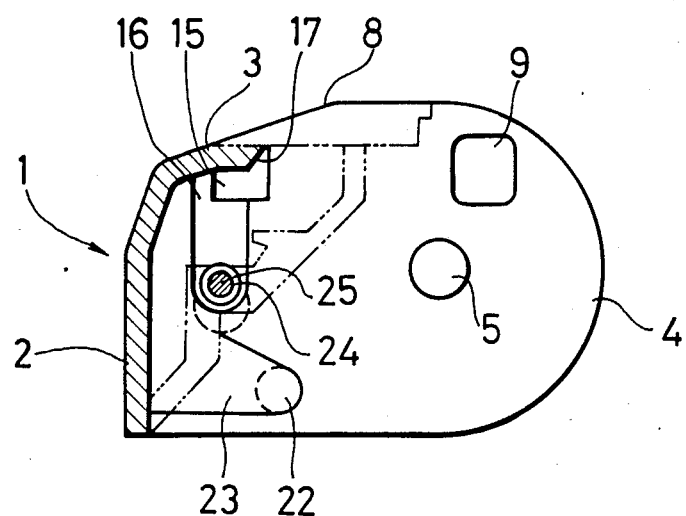
FIG. 5 is a cross-sectional view taken through the line III —III in FIG. 3.

FIG. 4 is a perspective view illustrating an embodiment of a tape cassette according to the present invention which is applied to a so called 8 mm video tape cassette. In this embodiment, as shown in FIG. 4, a tape cassette 11 comprises an upper half 11a and a lower half 11b, each being of substantially rectangular shape. Supply and take-up reels 12a and 12b are respectively located within the upper and lower halves 11a and 11b. One end of a magnetic tape 13, which is fixedly engaged at its other end to the supply reel 12a and wrapped therearound, is withdrawn from the tape cassette 11 formed of the upper and lower halves 11a, 11b to its outside, entered through the space between the front lid 1 and the back lid 8 into the tape cassette 11 again, and then engaged to the take-up reel 12b. The two reels 12a and 12b respectively have flanges 21 on their lower ends which are used to prevent themselves from being rotated upon non-use so that the magnetic tape 13 can be prevented from being slackened upon non-use. The upper half 11a has a transparent window 14 formed on its upper surface to enable the user to see the tape volume of the magnetic tape 13. The front lid 1 is rotataby pivoted to the right and left side walls 4, 4 of the tape cassette 11.

Figure 1:
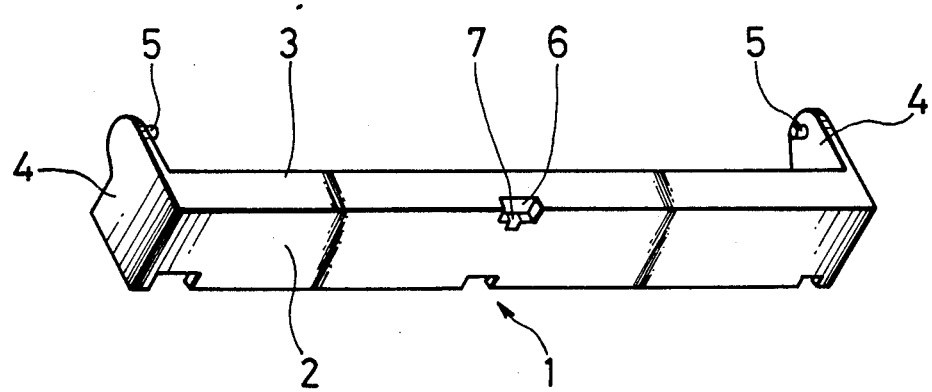
FIGS. 1 and 2 are perspective views of front lids used in conventional tape cassettes, respectively.
Figure 2:
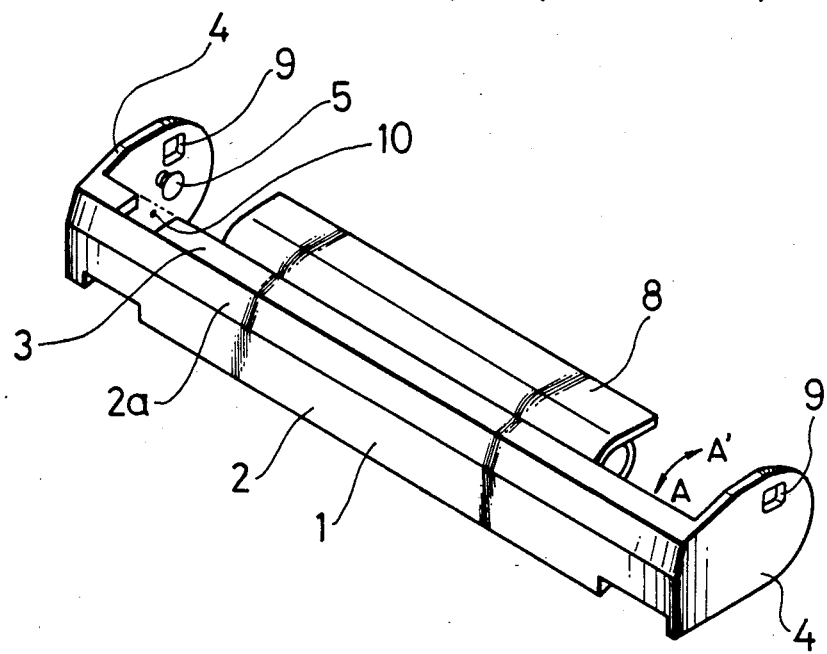
Figure 3:
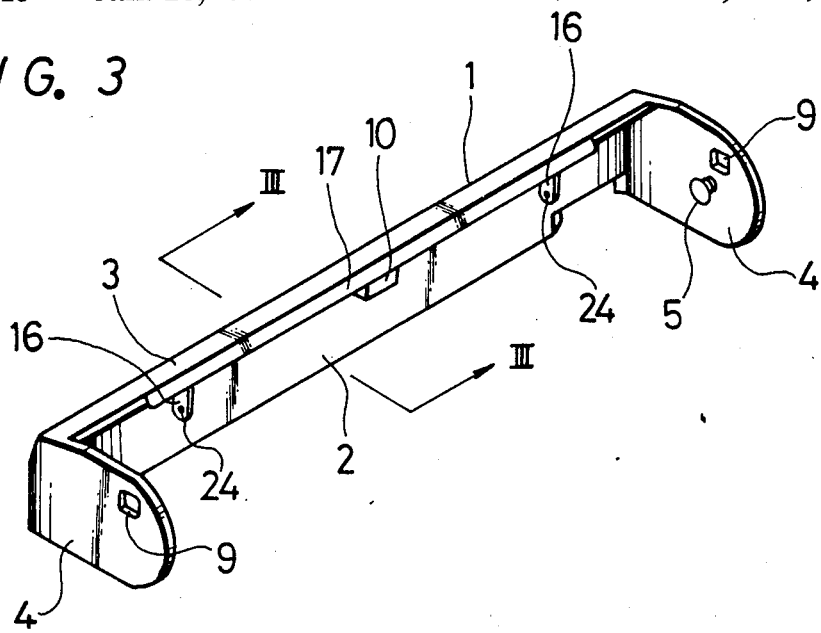
FIG. 3 is a perspective view of a front lid used in an embodiment of a tape cassette according to the present invention.

This front lid 1 is constructed as shown in FIG. 3 in which like parts corresponding to those of FIG. 2 are marked with the same references and therefore need not be described.

Referring to FIG. 3, through-holes 24 are respectively bored through bearing portions 16 extended downwardly from the rear wall of the top plate 3. The thick portion of the rear wall of the top plate 3 is chamfered to form a chamfered portion 17. A rib 15 (see FIG. 5) is formed at substantially the central portion of the chamfered portion 17, and this chamfered porion 17 is used as the injection gate portion 10 as will be described later. As shown by a phantom in a cross-sectional view forming FIG. 5, the back lid 8 is formed to be substantially a J-letter shape in cross section. The plate-shaped back lid 8 has a pivot shaft 25 formed at substantially central portions of its left and right side ends to project outwardly. The pivot shaft 25 is rotatably engaged into the through-holes 24, 24 of the bearing portions 16, 16 elongated downwardly from the rear wall of the top plate 3 of the front lid 1. The back lid 8 has ribs 23, 23 formed at its left and right side ends, and these ribs 23, 23 have guide pins 22, 22 implanted thereon to project outwardly. These guide pins 22, 22 are guided by a guide groove (not shown) formed on the cassette half to rotate the back lid 8 around the pivot shaft 25. Accordingly, when the tape cassette 11 is inserted into a cassette insertion opening of the VTR (not shown) and loaded onto the VTR, the magnetic tape 13 pinched between the front lid 1 and the back lid 8 is located to oppose the rotary head within the VTR, though not shown.

Figure 6:
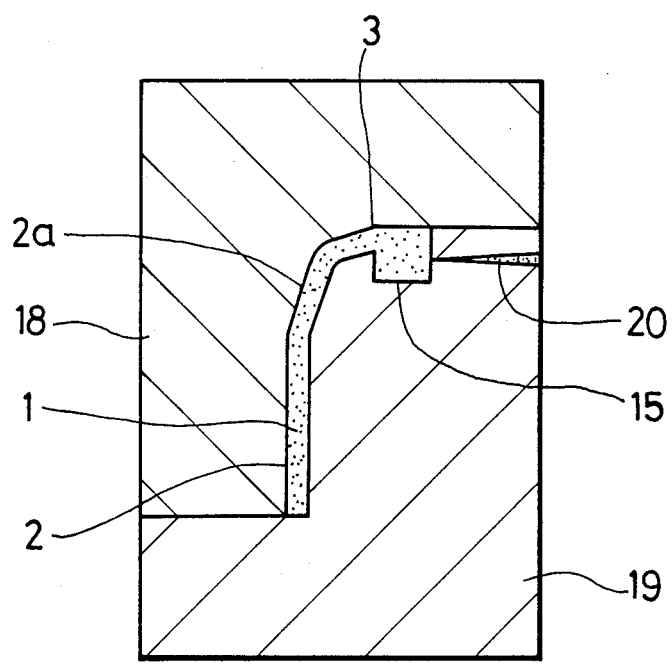
FIG. 6 is a cross-sectional view of a mold core used to mold the front lid shown in FIG. 3.

FIG. 6 shows a mold core used to injection-mold the front lid 1 shown in FIG. 3. In FIG. 6, reference numeral 18 designates an upper metallic mold core and 19 a lower metallic mold core. The tip end of a gate 20 in the metallic mold core is disposed, upon injection molding, at the thick portion (the chamfered portion 17) of the top plate 3 at the central portion of the front lid 1. Since this chamfered portion 17 is so thin that the rib 15 is formed at the central lower surface of the top plate 3 to be used as the injection gate portion 10, the area of the in gate portion 10 is increased, whereby the rib 15 serves as a cold slug well of the gate 20. If the injection molding is performed as described above, the synthetic resin is injected from substantially the central portion of the front lid 1 so that the balance of the gate is improved. Thus, the flow of the synthetic resin becomes uniform and the flow length of the synthetic resin is shortened so that the injection pressure can be decreased. Therefore, the cause of warp can be removed, the metallic mold core can be prevented from being broken and the burr produced on the parting line surface can be prevented from occurring so that the tape cassette can be produced with good productivity. Further, the occurrence of the flow mark and the short-shot or the like can be decreased so that it becomes possible to produce a tape cassette of which the surface is finished beautiful.

While in the above-mentioned embodiment the synthetic resin is injected through substantially the central portion of the rear surface of the front lid under the condition that the rib 15 is formed on the chamfered portion 17, the synthetic resin may be injected through the central portion of the thick chamfered portion 17 without the rib 15.

According to the tape cassette of the present invention, since the distances from the injection gate portion 10 to the right side wall 4 and to the left side wall 4 are substantially equal to each other, the balance of gate is excellent. Further, since the length in which the synthetic resin is flowed within the metallic mold cores is reduced to the half as compared with such a case that the left and right side walls 4 have the injection gate portions 10. Therefore, the necessary injection pressure can be reduced, thus making it possible to prevent the molded parts from being warped when the injection with high pressure is carried out.

Further, the short shot can be prevented from being produced and also, the occurrence of flow mark, shrink mark, burr and so on can be decreased thereby to increase the productivity. In addition, the surfaces of the curvature portion 2a formed on the front wall 2 of the front lid 1 and its upper wall portion 3 can be finished excellently.

The above description is presented by way of example on a single preferred embodiment of the invention and it will be apparent that many modifications and variations thereof could be effected by one with ordinary skill in the art without departing from the spirit and scope of the novel concepts of the invention so that the scope of the invention should be determined only by the appended claim.

We claim as our invention:

1. A tape cassette in which upon non-use a tape-exposed portion is closed by a front lid and a back lid provided at said tape-exposed portion of a reel-to-reel type tape cassette, comprising an injection gate provided at a thick portion of a top plate of said front lid at its central portion so that when said front lid is opened, said injection gate portion is untouchably covered by a recess of said back lid, said injection gate being used to mold said front lid.

2. A tape cassette according to claim 1, wherein said injection gate is covered by said back lid at least upon non-use.

3. A tape cassette according to claim 1, wherein said thick portion is chamfered to form a chamfered portion.

4. A tape cassette according to claim 3, wherein a rib is formed as a cold slug well of said injection gate at said central portion of said chamfered portion.

* * * * *